Figure 1:
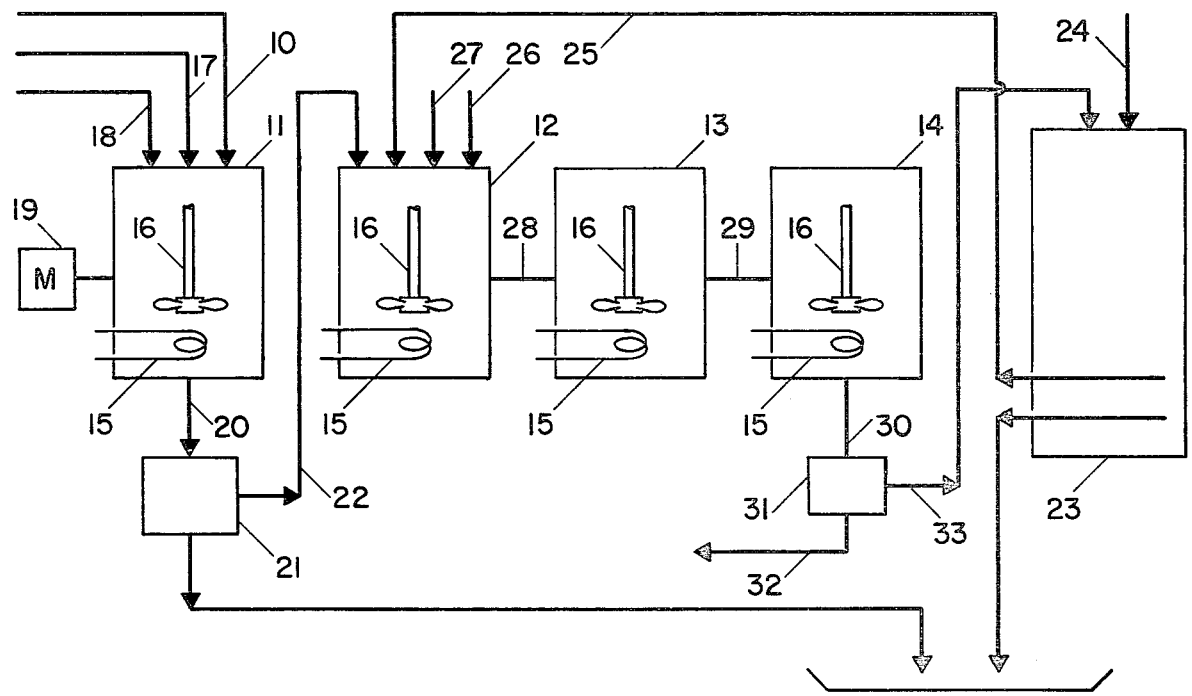

United States Patent [19]

Freeman et al.

[11] 4,252,622
[45] Feb. 24, 1981

[54] CONTINUOUS PROCESS FOR THE PURIFICATION OF ZINC PLANTS ELECTROLYTES USING COPPER ARSENATES

[75] Inventors: George M. Freeman, Montreal; Kayo Kangas, Connaught, both of Canada

[73] Assignee: Texasgulf Inc., Stamford, Conn.

[21] Appl. No.: 113,975

[22] Filed: Jan. 21, 1980

[30] Foreign Application Priority Data

Mar. 29, 1979 [CA] Canada .................................. 324562

[51] Int. Cl.$^3$ .............................................. C25C 1/16
[52] U.S. Cl. .................................... 204/119; 75/109
[58] Field of Search .......................... 204/119; 75/109

[56] References Cited

U.S. PATENT DOCUMENTS 3,979,266  9/1976  Fugleberg et al. .................. 204/119

*Primary Examiner*—R. L. Andrews
*Attorney, Agent, or Firm*—Denis A. Polyn

[57] ABSTRACT

Continuous process for the purification of zinc plant electrolyte employing copper arsenate for the removal of cobalt and associated impurities in a four-step treatment comprising:
  (1) cementation of copper with fine zinc dust,
  (2) precipitation of the major portion of cobalt by the addition of coarse zinc dust, dilute sulfuric acid and copper arsenate,
  (3) further addition of coarse zinc dust and dilute acid to precipitate more cobalt and reduce the cobalt level in said electrolyte to about 1.0 ppm, and
  (4) further addition of coarse zinc dust and dilute acid to reduce the cobalt level in said electrolyte to less than about 0.1 ppm.

8 Claims, 2 Drawing Figures

CURVE 1 RETENTION TIME - 1/2 HR.
CURVE 2 RETENTION TIME - 1 HR.

CONTINUOUS PROCESS FOR THE PURIFICATION OF ZINC PLANTS ELECTROLYTES USING COPPER ARSENATES

Zinc is the twenty-fourth most abundant element in the earth's crust and finds many industrial applications, the most important being the oxidation-resistant treatment of iron surfaces, and others being in various fields, including topical medicines, chemical reagents, etc.

Zinc is not found in the metallic state in nature. Its chief ore is zinc blend or sphalerite (ZnS) which is the source of ninety percent of the zinc produced today. The zinc production methods employed today have heavy treatment costs and consequently zinc metal producers demand high-grade concentrates.

There are two main methods of zinc recovery from its ores, i.e., thermal reduction and electrolytic deposition, the latter requiring the availability of relatively inexpensive electrical power in view of the fact that the production of one ton of zinc requires approximately 4500 kilowatt-hours. The purest zinc (99.99%) is achieved by the electrolytic methods.

The current world production of zinc is about 3,800,000 metric tons per year, 47% by electrolytic methods and the balance by thermal methods.

The thermal methods involve the following general reactions:

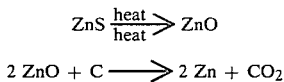

$$2 ZnO + C \longrightarrow 2 Zn + CO_2$$

The electrolytic methods generally involve the following reactions:

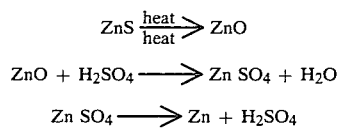

$$ZnO + H_2SO_4 \longrightarrow Zn SO_4 + H_2O$$

$$Zn SO_4 \longrightarrow Zn + H_2SO_4$$

Electrolytic zinc plants utilize four operations: (1) roasting of zinc sulfide concentrate; (2) leaching of the roasted concentrate or calcine to extract the soluble zinc; (3) purification of the resulting solution; and (4) electrolysis of the solution of obtain metallic zinc.

Zinc electrolyte typically contains impurities of copper, cobalt, nickel and cadmium that are detrimental to the plating of zinc and must be removed prior to electrolysis. In past practice these elements were removed by a hot copper sulfate/arsenic trioxide/zinc dust purificiation procedure.

The precise mechanism of the hot copper sulfate/arsenic trioxide/zinc dust purification technique is not thoroughly understood. However, a plausible explanation is as follows: Zinc dust displaces copper and arsenic from solutions which are through to precipitate as a metallic couple. Zinc dust ordinarily does not displace cobalt and nickel from solution, but in the presence of the copper-arsenic couple such metals are quantitatively precipitated. The above copper sulfate addition may not be necessary if sufficient copper is already present in the impure zinc electrolyte.

The byproduct of the purification procedure is a cement copper cake residue containing, in addition to copper, varying amounts of zinc, cadmium, cobalt, nickel and arsenic. The market value of such cake is primarily dependent on the percentage of copper contained therein.

There are several disadvantages to the above described purificiation procedure.

(1) The process requires the addition of arsenic trioxide and possibly copper sulfate, which affects the economics of the overall process.

(2) The cement copper cake residue, because of its arsenic content, has a greatly reduced market value.

(3) The zinc, cadmium and cobalt values in the cement copper cake are not reflected in the marketable value of the latter and consequently reflect losses in the overall process economics.

U.S. Pat. No. 4,049,514 discloses a process that relates to the electrolytic production of zinc metal and involves the treatment of residue from such production processes to provide copper arsenate to be recycled for use in the preliminary purification of the zinc electrolyte, and simultaneously to upgrade the copper and reduce the arsenic content in the treated residue to increase the market value thereof and thereby process economics.

Upgrading of cement copper cake and recovery of arsenic is accomplished in the patented process in four basic operations: (1) Acid leaching; (2) cobalt removal; (3) caustic leach; and (4) arsenic removal. The acid leach is conducted under optimum conditions for the dissolution of zinc, cadmium and cobalt while at the same time suppressing copper extraction. The solution and residue of the acid leach are separated by filtration for further processing. In order to make a zinc/cadmium solution suitable for recycle to the zinc plant, cobalt is removed from the acid leach solution. The copper and arsenic containing residue from the acid leach is subjected to a caustic leach to dissolve the arsenic. The caustic leach slurry is then filtered. This leaves a residue containing 60 to 80 percent copper and less than 1 percent arsenic providing an improved marketable product for its copper values.

Arsenic is removed from the caustic leach solution by precipitation as copper arsenate which is used as a substitute for arsenic trioxide and copper sulfate in the first stage purification of zinc electrolyte.

The process of the present invention is an improvement on the process disclosed in U.S. Pat. No. 4,049,514 relating to the purification of impure zinc plant electrolyte and comprises a continuous, four-stage sequence, in Stage 1, copper being precipitated with fine zinc dust to form a cement copper which is then removed by conventional mechanical separation; in Stage 2, dilute sulfuric acid, coarse zinc dust and copper arsenate are added under conditions and in amounts to cause precipitation of a majority (up to about 90%) of the cobalt; in Stages 3 and 4, additional coarse zinc dust and acid are added to the electrolyte to precipitate remaining amounts of cobalt to provide a final purified electrolyte in which the cobalt level is less than about 0.1 ppm.

Figure 2:
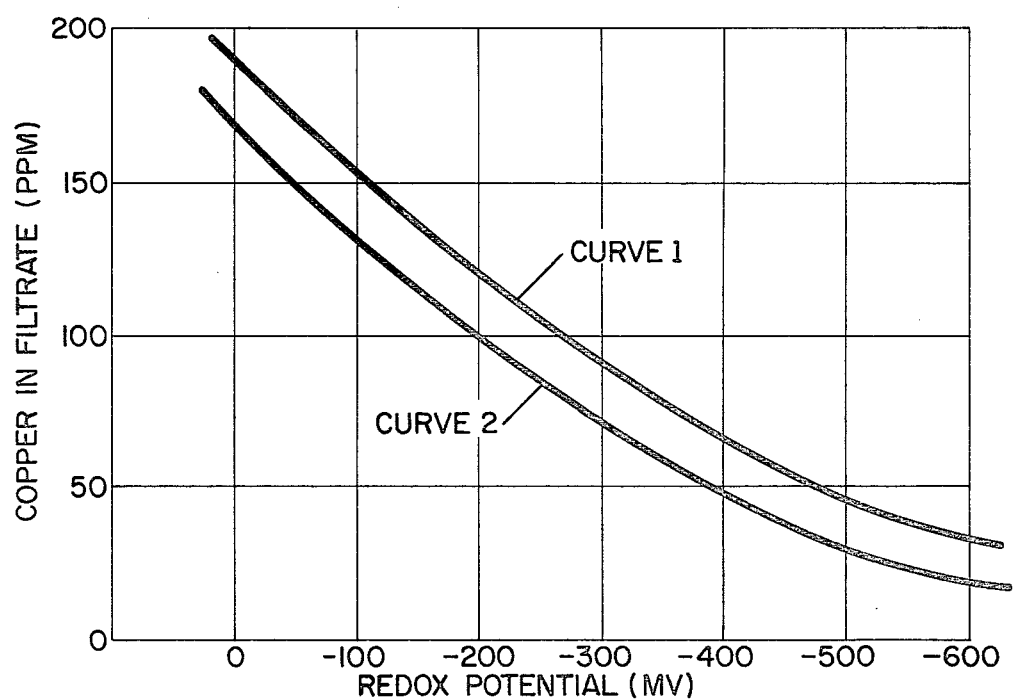

In the drawings,

FIG 1 is a schematic flow sheet of the process according to the present invention; and FIG. 2 is a plot of redox potential versus copper in the filtrate in Stage 1 of the process.

Referring now to FIG. 1, and describing in detail the preferred embodiment of the invention, the impure zinc electrolyte obtained from the leaching of the roasted zinc oxide concentrate by sulfuric acid is delivered continuously through line 10 to tank 11 connected in series to tanks 12, 13 and 14. All tanks contain steam coils 15 for temperature control and, in addition, all tanks are equipped with agitators 16 to achieve mixing and sustained agitation of the reagent and other additions within the tank.

The impure zinc electrolyte is delivered continuously to tank 11 at a controlled rate of flow to give a preferred residence time in tank 11 of one hour. The residence time in tank 11 is one of the determinants of the degree of copper removal (decopperization) and quality (grade and impurity content) of the precipitate. In addition to impure electrolyte, fine zinc dust (less than about +72 Tyler mesh) is delivered to tank 11 through conduit 17 and dilute sulfuric acid (cellhouse circulating solution, 15% $H_2SO_4$ content) is introduced through line 18, to achieve the removal of copper from the electrolyte in the form of a solid precipitate referred to as "cement copper".

The decopperization process is carried out at a temperature of from about 80° to about 95° C., the temperature being maintained by means of the steam coil 15 within the tank. The electrolyte acidity is adjusted to a value of about pH 3.0 by the addition of the dilute acid and is maintained at that level by regulating the acid addition at a constant flow to achieve the desired pH value.

The quantity of fine zinc dust added is controlled to be approximately equivalent to the calculated stoichiometric quantity required to displace the copper from solution. The zinc dust addition is monitored and can be controlled on a continuous basis using the redox (reduction-oxidation) potential of the electrolyte solution, the potential being expressed as mv (millivolts). Millivolt meter 19 forms part of a control loop for the addition of zinc dust. The redox potential in this process is set to control zinc dust addition to give an electrolyte potential of from about +200 to about −600 mv. The redox range employed determines the degree of decopperization, influences the quality of the final product, and limits the precipitation of extraneous metals other than the copper. FIG. 2 shows the effect of redox potential and retention time on the removal of copper during the treatment in tank 11.

The solution containing the electrolyte and precipitated copper (slurry) is withdrawn from tank 11 through line 20 at a rate consistent with electrolyte addition to the tank, to achieve a constant liquid level in tank 11. The slurry is withdrawn conveniently by any well-known means, e.g., syphon, stillwells or tank bottom outlets as shown in FIG. 1, and is then pumped to pressure filter 21 such as a Shriver press or other conventional liquid-solids separation equipment (e.g., settling tanks, drum filters, cyclones, centrifuges, etc.). The clarified solution is delivered through conduit 22 to tank 12, the second tank in the series. The precipitated cement copper product may be washed in press 21, but is ultimately removed from the press and becomes the first product of the process, having an assay of approximately 90% by weight copper, 1% combined zinc and cadmium, and nil arsenic. The cement copper alternately may be shipped to a copper smelter or converted to liquid copper sulfate for use as a milling reagent.

Typical assays for the impure electrolyte, cement copper and clarified solution involved in the first stage of the process as described above in reference to tank 11 is shown in Table I:

TABLE I

| Impure Electrolyte | Cemented Copper | Clarified Solution |
|---|---|---|
| Cu 723 ppm | Cu 93.6% | Cu 336 ppm |
| Zn 124 g/l | Zn 0.51% | Zn 125.7 g/l |
| Cd 473 ppm | Cd 0.43% | Cd 489 ppm |
| Co 18 ppm | Co 0.002% | Co 18 ppm |
| As 0.62 ppm | As 0.22% | As 0.68 ppm |

To the solution in tank 12 is added a regulated continuous stream of copper arsenate (as slurry) to satisfy the objective of the purification. As shown in FIG. 1, previously inventoried cement copper cake containing approximately 42% by weight copper and 7% by weight arsenic is introduced into treatment section 23 through line 24 wherein it is treated in accordance with the acid leach, caustic leach and arsenic removal steps as described in U.S. Pat. No. 4,049,514 (the description of which is incorporated herein by reference) to provide a copper arsenate which is delivered through line 25 to tank 12. The copper arsenate addition is calculated to give an arsenic concentration of up to 4.499 grams (As content) per cubic meter of electrolyte flow multiplied by the cobalt assay in milligrams per liter.

To tank 12 through line 26 is also added spent acid or sulfuric acid in an amount to give a pH value of 3.0 to 4.5. Coarse zinc dust (of a size greater than about +72 Tyler mesh) is added through line 27 in an amount adequate to react continuously with the free sulfuric acid to form zinc sulfate and evolve hydrogen gas to provide the necessary reducing conditions of the electrolyte undergoing purification. In tank 12 approximately 90% of the cobalt is removed.

Typical assays of the residue and exiting solution are shown below in Table II:

TABLE II

| Residue | Solution |
|---|---|
| Cu 9.3% | Cu 4 ppm |
| Zn 33.1% | Zn 135.1 g/l |
| Cd 2.93% | Cd 279 ppm |
| Co 0.29% | Co 5 ppm |
| As 2.35% | As 1.81 ppm |

Although optionally the precipitated cobalt could be removed from the slurry upon its leaving tank 12, in the preferred embodiment, the entire slurry is delivered to tank 13 through conduit 28 where additional acid and coarse zinc dust are added if necessary to give the solution an increased pH of approximately 3.5 to 4.5.

A typical assay of the residue and exiting solution from tank 13 is shown below in Table III:

TABLE III

| Residue | Solution |
|---|---|
| Cu 10.8% | Cu 0.3 ppm |
| Zn 28.3% | Zn 142.5 g/l |
| Cd 3.31% | Cd 325 ppm |
| Co 0.45% | Co 0.6 ppm |
| As 2.05% | As 1.05 ppm |

From tank 13 the electrolyte and solids are delivered through conduit 29 to tank 14. At this point, the cobalt level in the solution is less than about 1 ppm is shown in Table III. To tank 14 a small amount of coarse zinc dust is added to insure the continuing reducing conditions described earlier and the acidity in the tank is allowed to decrease to a pH value of from about 4.0 to 4.5. The addition of zinc dust is in an amount sufficient to ultimately decrease the cobalt level to less than about 0.1 ppm and satisfy the Gutzeit arsenic/antimony test for completeness of purification. The electrolyte and precipitated or suspended cobalt and related impurities is pumped at a regulated rate through line 30 to conventional liquid-solids separation means 31 of the type described above.

The filtrate, now clarified electrolyte, is delivered through line 32 for further utilization and the separated solids are delivered through line 33 to section 23 for further treatment in accordance with the procedures of U.S. Pat. No. 4,049,514.

A typical assay of the residue and solution resulting from the treatment in tank 14 is shown below in Table IV:

TABLE IV

| Residue | Solution |
|---|---|
| Cu 11.9% | Cu 0.25 ppm |
| Zn 27.4% | Zn 140.5 g/l |
| Cd 2.93% | Cd 341 ppm |
| Co 0.49% | Co 0.15 ppm |
| As 2.32% | As 0.44 ppm |

A pilot plant test was carried out utilizing the process of the present invention. Four tanks of approximately ninety Imperial Gallons capacity each were connected in series and equipped with steam coils and motor driven agitators, i.e., 4 inch turbine impellers driven at 700 rpm. The temperature in each tank was maintained at about 95° C. Cellhouse acid (15% $H_2SO_4$) was used to adjust and maintain the pH in each tank according to the above mentioned requirements. Electrolyte flow was 6.8 liters/minute, copper arsenate flow into the second tank was in the range of from about 0.05 to about 0.2 liters/minute, and zinc dust additions were approximately 800–1200 grams/hour total for all four tanks. The conditions and results are indicated in the following tables.

Table V shows the assay of the impure electrolyte during the pilot plant tests at spaced daily intervals as shown:

TABLE V

| | IMPURE ELECTROLYTE QUALITY | | | | |
|---|---|---|---|---|---|
| Day | Cu ppm | Zn g/l | Cd ppm | Co ppm | As ppm |
| 1 | 410 | 125.5 | 430 | 15 | 0.49 |
| 2 | 540 | 118.0 | 460 | 16 | — |
| 3 | 625 | 145.0 | 460 | 17 | — |
| 4 | 500 | 124.0 | 470 | 17 | 0.44 |
| 5 | 540 | 118.0 | 540 | 21 | 0.54 |
| 22 | 940 | 123.0 | 470 | 21 | 0.66 |
| 23 | 990 | 127.0 | 480 | 19 | 0.66 |
| 24 | 1050 | 116.0 | 505 | 19 | 0.77 |
| 25 | 910 | 116.0 | 440 | 18 | 0.77 |
| Average | 723 | 124.0 | 473 | 18 | 0.62 |

Table VI indicates the assay of the copper cement at the same daily intervals:

TABLE VI

| | COPPER CEMENT QUALITY | | | | | | | | |
|---|---|---|---|---|---|---|---|---|---|
| Day | % Cu | % Zn | % Cd | % Co | % As | No. 1 Tank Cu (ppm) | No. 1 Tank Redox (mv) | No. 1 Tank pH | Zinc (Fine) g/l |
| 1 | 90.1 | 0.45 | 0.04 | <0.001 | 0.12 | 330 | +124 | 3.2 | 0.17 |
| 2 | 96.3 | 0.54 | 0.17 | 0.003 | 0.22 | 350 | +71 | 3.3 | 0.38 |
| 3 | 95.0 | 0.30 | 0.62 | 0.002 | 0.40 | 345 | +65 | 3.2 | 0.36 |
| 4 | 93.5 | 0.44 | 0.15 | 0.003 | 0.30 | 320 | +53 | 3.1 | 0.30 |
| 5 | 93.5 | 0.46 | 0.60 | 0.002 | 0.15 | 160 | +8 | 3.1 | 0.56 |
| 22 | | | | | | 360 | +75 | 3.4 | 0.62 |
| 23 | 93.2 | 0.85 | 1.00 | 0.001 | 0.15 | 390 | +68 | 3.3 | 0.69 |
| 24 | | | | | | 353 | +71 | 3.1 | 0.66 |
| 25 | | | | | | 420 | +71 | 3.2 | 0.75 |
| Avg. | 93.6 | 0.51 | 0.43 | 0.002 | 0.22 | 336 | +68 | 3.2 | 0.50 |

Table VII shows the copper arsenate slurry utilization during the pilot plant tests:

TABLE VII

| | COPPER ARSENATE SLURRY UTILIZATION | | | | |
|---|---|---|---|---|---|
| | Impure Electrolyte Cobalt | Impure Electrolyte Volume | Copper Arsenate Slurry | | Arsenic Added g "As"/ppm |
| Day | (ppm) | (liters/min.) | l/min | G.P.L. "As" | Co/m³ of Solution |
| 1 | 15 | 6.8 l/min | 0.143 | 3.2 | 4.49 |
| 2 | 16 | 6.8 l/min | 0.076 | 5.3 | 3.70 |
| 3 | 17 | 6.8 l/min | 0.068 | 5.6 | 3.29 |
| 4 | 17 | 6.8 l/min | 0.069 | 5.3 | 3.16 |
| 22 | 21 | 6.8 l/min | 0.118 | 5.6 | 4.62 |
| 23 | 19 | 6.8 l/min | 0.112 | 4.0 | 3.46 |
| 24 | 19 | 6.8 l/min | 0.108 | 3.5 | 2.92 |
| 25 | 18 | 6.8 l/min | 0.063 | 4.3 | 2.21 |

Table VII shows the No. 1 tank solution assays:

TABLE VIII

| | NO. 1 TANK SOLUTION ASSAYS | | | | |
|---|---|---|---|---|---|
| Day | Cu ppm | Zn g/l | Cd ppm | Co ppm | As ppm |
| 1 | 330 | 128.0 | 440 | 15 | 1.25 |
| 2 | 350 | 123.0 | 500 | 17 | — |
| 3 | 345 | 123.0 | 480 | 17 | — |
| 4 | 320 | 131.0 | 500 | 17 | 0.86 |
| 5 | 160 | 123.0 | 530 | 22 | 0.22 |
| 22 | 360 | 139.0 | 430 | 20 | 0.38 |
| 23 | 390 | 130.0 | 490 | 20 | 0.71 |
| 24 | 353 | 118.0 | 525 | 19 | 0.60 |
| 25 | 420 | 116.0 | 510 | 18 | 0.77 |
| Average | 336 | 125.7 | 489 | 18 | 0.68 |

Table IX shows the No. 2 tank solution and residue assays:

TABLE IX

NO. 2 TANK SOLUTION ASSAYS - RESIDUE ASSAYS

| Day | Cu ppm | Zn g/l | Cd ppm | Co ppm | As ppm | Cu % | Zn % | Cd % | Co % | As % |
|---|---|---|---|---|---|---|---|---|---|---|
| 1 | 2 | 138.0 | 220 | 5 | 3.56 | | | | | |
| 2 | 3 | 134.0 | 310 | 5 | — | | | | | |
| 3 | 4 | 135.0 | 280 | 6 | — | | | | | |
| 4 | 6 | 140.0 | 210 | 4 | 1.92 | 3.90 | 32.4 | 1.55 | 0.12 | 1.80 |
| | | | | | | \multicolumn{5}{c}{Weekly Residue Composite} | | | | |
| 5 | — | — | — | — | — | | | | | |
| 22 | 7 | 141.0 | 320 | 2 | 2.90 | | | | | |
| 23 | 4 | 134.0 | 280 | 6 | 1.32 | | | | | |
| 24 | 2 | 124.0 | 300 | 5 | 0.88 | | | | | |
| 25 | 3 | — | 310 | 6 | 0.27 | 14.6 | 33.7 | 4.30 | 0.45 | 2.90 |
| | | | | | | \multicolumn{5}{c}{Weekly Residue Composite} | | | | |
| Average | 4 | 135.1 | 279 | 5 | 1.81 | 9.3 | 33.1 | 2.93 | 0.29 | 2.35 |

Table X shows the No. 3 tank solution and residue assays:

TABLE X

NO. 3 TANK SOLUTION ASSAYS - RESIDUE ASSAYS

| Day | Cu ppm | Zn g/l | Cd ppm | Co* ppm | As ppm | Cu % | Zn % | Cd % | Co % | As % |
|---|---|---|---|---|---|---|---|---|---|---|
| 1 | 0.5 | 145.0 | 290 | 0.2 | 1.04 | | | | | |
| 2 | 0.2 | 142.0 | 380 | 1.0 | — | | | | | |
| 3 | 0.1 | 146.0 | 350 | 1.0 | — | | | | | |
| 4 | 0.2 | 155.0 | 260 | 0.6 | 0.77 | 5.90 | 30.3 | 1.87 | 0.29 | 2.00 |
| | | | | | | \multicolumn{5}{c}{Weekly Residue Composite} | | | | |
| 5 | — | — | — | — | — | | | | | |
| 22 | 0.6 | 150.0 | 350 | 0.3 | 2.24 | | | | | |
| 23 | 0.2 | 148.0 | 320 | 0.5 | 0.82 | | | | | |
| 24 | 0.3 | 138.0 | 330 | 0.4 | 0.55 | | | | | |
| 25 | 0.2 | 116.0 | 320 | 0.8 | 0.88 | 15.6 | 26.3 | 4.75 | 0.60 | 2.10 |
| | | | | | | \multicolumn{5}{c}{Weekly Residue Composite} | | | | |
| Average | 0.3 | 142.5 | 325 | 0.6 | 1.05 | 10.8 | 28.3 | 3.31 | 0.45 | 20.5 |

*Plant Cobalt Test - Nitroso-R-Salt Method

Table XII shows the results of tests of redox potential versus copper cake quality.

TABLE XII

CONTINUOUS DECOPPERIZATION WITH REDOX CONTROL - CAKE QUALITY

| Test No. | Redox mv | SOLUTION COPPER - ppm Impure | No. 1 Tank | % Copper Cemented | Cake Quality - % Copper | Cobalt | Cadmium | Arsenic | Zinc |
|---|---|---|---|---|---|---|---|---|---|
| 1 | -100 | 1205 | 87 | 92.8 | 94.8 | 0.02 | 0.82 | 0.1 | 0.5 |
| 2 | -60 | 1400 | 178 | 87.3 | 92.6 | 0.1 | 0.86 | 0.1 | 0.7 |
| 3 | -150 | 1781 | 165 | 90.7 | 90.5 | 0.1 | 0.85 | 0.1 | 0.7 |
| 4 | -100 | 1284 | 114 | 91.1 | 92.1 | 0.1 | 0.76 | 0.1 | 0.5 |
| 5 | -270 | 1066 | 92 | 91.4 | 92.6 | 0.04 | 0.97 | 0.1 | 0.4 |

Table XI shows the No. 4 tank solution and residue assays:

TABLE XI

NO. 4 TANK SOLUTION ASSAYS - RESIDUE ASSAYS

| Day | Cu ppm | Zn g/l | Cd ppm | Co* ppm | As ppm | Cu % | Zn % | Cd % | Co % | As % |
|---|---|---|---|---|---|---|---|---|---|---|
| 1 | 0.3 | 148.0 | 300 | 0.1 | 0.27 | 14.8 | 33.0 | 4.07 | 0.75 | 3.10 |
| 2 | 0.2 | 141.0 | 380 | 0.1 | 0.40 | 6.8 | 30.0 | 1.15 | 0.28 | 1.20 |
| 3 | <0.1 | 147.0 | 350 | 0.3 | — | 4.7 | 29.7 | 1.85 | 0.26 | 0.99 |
| 4 | 0.2 | 150.0 | 260 | 0.2 | 0.28 | 2.6 | 30.2 | 0.86 | 0.16 | 1.30 |
| 5 | — | — | — | — | — | | | | | |
| 22 | 0.5 | 148.0 | 360 | <0.1 | | | | | | |
| 23 | 0.2 | 138.5 | 340 | 0.1 | 0.66 | 24.3 | 20.1 | 4.87 | 0.95 | 4.30 |
| 24 | 0.3 | 135.0 | 375 | <0.1 | 0.21 | 13.2 | — | 6.01 | — | — |
| 25 | 0.2 | 116.0 | 360 | 0.2 | 0.82 | 16.6 | 21.4 | 1.70 | 0.56 | 3.00 |
| Average | 0.25 | 140.4 | 341 | 0.15 | 0.44 | 11.9 | 27.4 | 2.93 | 0.49 | 2.32 |

*Plant Cobalt Test

As can be seen from the above description and data, the present invention provides a safe, efficient and economic continuous process for the purification of impure zinc electrolyte. Certain additions and changes may be made by those skilled in the art without departing from the scope and spirit of the invention.

What is claimed is:

1. A continuous process for purifying impure zinc plant electrolyte to remove copper, cobalt and associated impurities therefrom comprising the steps of:
    (a) treating said electrolyte with dilute sulfuric acid and a stoichiometric amount of fine zinc dust to precipitate substantially all of the copper from said electrolyte as cement copper;
    (b) separating said cement copper from said electrolyte;
    (c) next adding to said electrolyte additional dilute acid and coarse zinc dust, and an amount of copper arsenate sufficient to precipitate a major amount of the cobalt from said electrolyte;
    (d) adding additional dilute acid and coarse zinc dust to said electrolyte to precipitate additional cobalt therefrom;
    (e) adding additional dilute acid and coarse zinc dust to said electrolyte in an amount sufficient to precipitate a further quantity of cobalt to reduce the remaining cobalt level in said electrolyte to below about 0.1 ppm; and
    (f) separating the precipitated cobalt from said electrolyte;

2. In the process of claim 1, step (a) being carried out at a temperature of at least about 80° C., said dilute acid in step (a) having a concentration of about 15% $H_2SO_4$ and being added to said electrolyte to maintain the pH thereof at about 3.0, and said fine zinc dust in step (a) having a mesh size of less than about +72 Tyler mesh.

3. In the process of claim 2, said fine zinc dust being added to said electrolyte in amounts sufficient to maintain the reduction-oxidation potential of the electrolyte in the range of from about +200 mv to about −600 mv.

4. In the process of claim 2, the residence time in step (a) being about one hour.

5. In the process of claim 1, step (c), said acid having a concentration of about 15% $H_2SO_4$ and being added in an amount sufficient to maintain the pH at about 3.0 to 4.5, said coarse zinc dust having a mesh size of greater than about +72 Tyler mesh and being added in an amount sufficient to react with said acid and form hydrogen gas to provide reducing conditions for said electrolyte, and said copper arsenate being added to give an arsenic concentration of up to about 4.5 grams (arsenic content) per cubic meter of electrolyte flow multiplied by the cobalt content in milligrams per liter.

6. In the process of claim 1, step (d), said additional acid being added in an amount sufficient to maintain the pH of the electrolyte between about 3.5 to 4.5 and said coarse zinc dust being added in an amount sufficient to reduce the cobalt level in said electrolyte to below about 1 ppm.

7. In the process of claim 1, step (e), said additional acid being added in an amount sufficient to maintain the pH of said electrolyte between about 4.0 to 4.5 and said coarse zinc dust being added in an amount sufficient to reduce the cobalt level in said electrolyte to below about 0.1 ppm.

8. A continuous process for purifying impure zinc plant electrolyte to remove copper, cobalt and associated impurities therefrom comprising the steps of:
    (a) treating said electrolyte in a first tank at about 80° to 95° C. with sulfuric acid to maintain a pH of about 3.0 and a stoichiometric amount of zinc dust (less than +72 Tyler mesh) to maintain a redox potential in the range of +200 to −600 mv and precipitate substantially all of the copper from said electrolyte as cement copper the residence time in said first tank being about one hour;
    (b) separating said cement copper from said electrolyte;
    (c) transferring the separated electrolyte to a second tank and adding additional dilute acid to maintain a pH of about 3.0 to 4.5 in an amount to provide reducing conditions in said tank and adding coarse zinc dust (+72 Tyler mesh), and further adding an amount of copper arsenate sufficient to precipitate about 90% of the cobalt and form a slurry with said electrolyte;
    (d) transferring said slurry to a third tank and adding additional dilute acid to maintain a pH of about 3.5 to 4.5 and adding coarse zinc dust to said slurry to precipitate additional cobalt and reduce the dissolved cobalt level to about 1.0 ppm;
    (e) transferring said slurry to a fourth tank and adding additional dilute acid to give a pH of about 4.0 to 4.5 and adding coarse zinc dust to said slurry in an amount sufficient to precipitate a further quantity of cobalt to reduce the remaining dissolved cobalt level in said electrolyte to below about 0.1 ppm; and
    (f) separating the precipitated cobalt from said electrolyte.

* * * * *